United States Patent
Bergen (10) Patent No.: US 10,423,522 B2
(45) Date of Patent: Sep. 24, 2019

(54) SYSTEM AND METHOD FOR DETECTING AN ERROR IN SOFTWARE

(71) Applicant: salesforce.com, inc., San Francisco, CA (US)

(72) Inventor: Philip Bergen, Haiku, HI (US)

(73) Assignee: salesforce.com, inc., San Francisco, CA (US)

( * ) Notice: Subject to any disclaimer, the term of this patent is extended or adjusted under 35 U.S.C. 154(b) by 167 days.

(21) Appl. No.: 15/485,593

(22) Filed: Apr. 12, 2017

(65) Prior Publication Data

US 2018/0300227 A1 Oct. 18, 2018

(51) Int. Cl.
| | |
|---|---|
| *G06F 11/00* | (2006.01) |
| *G06F 11/36* | (2006.01) |
| *G06N 20/00* | (2019.01) |
| *G06F 11/07* | (2006.01) |
| *G06N 5/02* | (2006.01) |

(52) U.S. Cl.
CPC ........ *G06F 11/3688* (2013.01); *G06F 11/008* (2013.01); *G06F 11/079* (2013.01); *G06F 11/362* (2013.01); *G06N 20/00* (2019.01); *G06N 5/025* (2013.01)

(58) Field of Classification Search
CPC .............. G06F 11/3688; G06F 11/079; G06F 11/0793; G06F 11/3604; G06F 11/3612; G06F 11/362; G06F 11/366; G06F 11/3664; G06F 11/008; G06N 99/005; G06N 20/00; G06N 5/025
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Joseph D Manoskey
(74) *Attorney, Agent, or Firm* — Lorenz & Kopf, LLP (57) ABSTRACT

A computer-implemented method of detecting a likely software malfunction is provided. The method comprises collecting a plurality of software error data sets wherein each software error data set comprises a proposed code section containing an error and a corrected code section containing code changes that fixed the error in the proposed code section. The method further comprises training a computer-implemented algorithmic model using the collected software error data sets to devise a software code classifier for predicting a likely error in a code section, reviewing a section of code using the software code classifier, and identifying suspicious code in the reviewed section of code as containing a suspected error using the software code classifier.

20 Claims, 9 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2017/0161182 A1* | 6/2017 | Yoshida ............ G06F 11/3692 |
| 2017/0212829 A1* | 7/2017 | Bales ................ G06F 11/3664 |
| 2018/0060150 A1* | 3/2018 | Cunico .............. G06F 11/079 |
| 2018/0276103 A1* | 9/2018 | Woulfe .............. G06F 11/362 |

* cited by examiner

SYSTEM AND METHOD FOR DETECTING AN ERROR IN SOFTWARE

TECHNICAL FIELD

Embodiments of the subject matter described herein relate generally to software development environments, and more particularly to machine learning techniques for detecting software coding errors during software code development.

BACKGROUND

Many organizations provide a version control system for tracking software code changes. Engineers, programmers, and software coders check code into the version control system as changes are made. Some changes function as intended and some do not. Changes that do not function as intended include coding errors that are detectable using regression tests and coding errors that are undetectable with existing regression tests. In either case, coding errors can cause productivity loss. In the undetectable case, a coding error also carries the risk of causing customer data loss, loss of revenue, and/or a damaged reputation.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The subject matter described herein discloses apparatus, systems, techniques and articles for detecting potential errors in software code during the software development process using a software classifier devised using machine learning techniques. The software classifier can learn to detect suspicious software code by studying software code containing errors.

Figure 1:
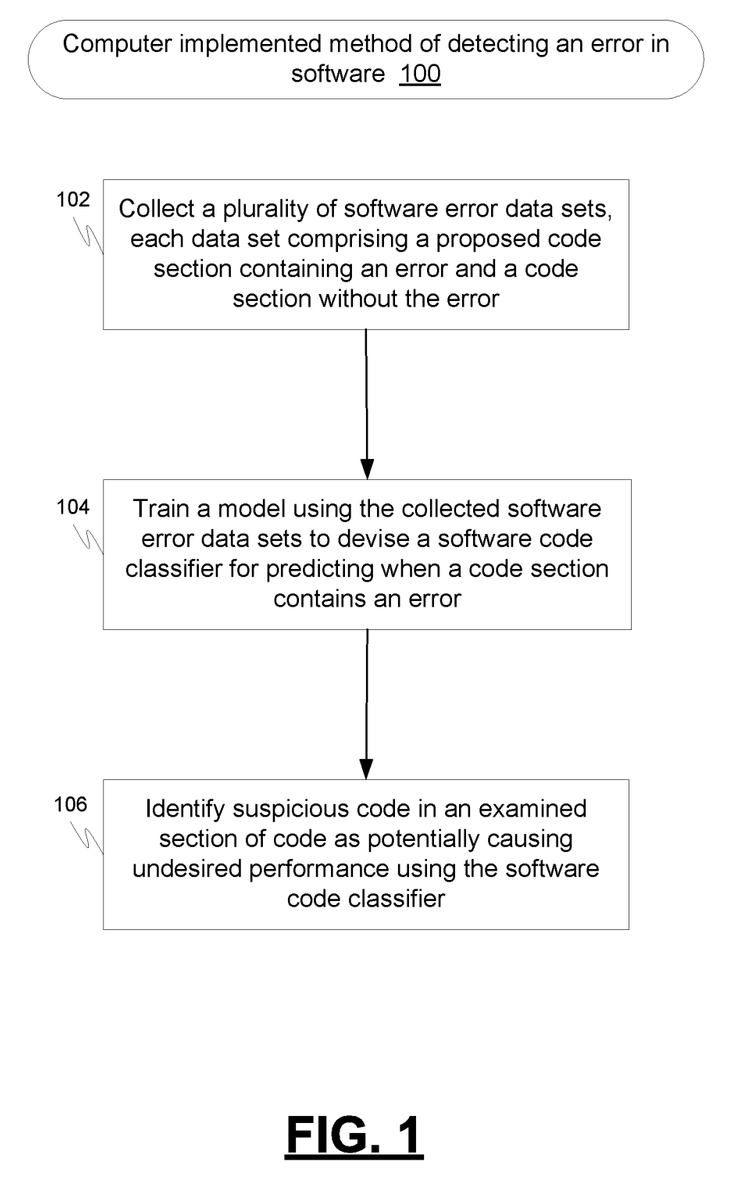
FIG. 1 is a process flow chart depicting an example computer-implemented process, based on machine learning, for identifying a suspicious section of code, in accordance with some embodiments.

FIG. 1 is a process flow chart depicting an example computer-implemented process 100, based on machine learning, for identifying a suspicious section of code. The suspicious section of code, in this example, is a section of code that may be syntactically proper but nonetheless does not, when executed, cause the desired effect or performance and/or, when executed, cause an undesired effect or performance in another section of code. The example process 100 can train a machine that can examine a code section and identify suspicious code in the examined code section without executing the software. The suspicious code can be further examined to determine if it actually will cause software execution problems. This may allow for faster software development because potentially code problems may be identified earlier in the software development process.

The example process 100 includes operations to collect a plurality of software error data sets (operation 102). In this example, each software error data set includes a proposed code section with erroneous code that causes undesired performance and a corrected code section containing code changes that corrected the erroneous code in the proposed code section. In another example, each software error data set may include a section of properly performing code and a proposed code section with code changes that cause undesired performance. With either example software error data set, erroneous code can be identified by comparing the code with the error and the code without the error.

The example process 100 also includes operations to train an algorithmic model using the collected software error data sets (operation 104). Training a model using the collected software error data sets is performed using machine learning techniques to devise a predictive model or algorithm (referred to herein as a software classifier) for predicting when a section of code contains suspicious code that may cause undesired performance. In another example, training a model using the collected software error data sets may be performed using machine learning techniques to devise a predictive model or algorithm for not only predicting when a section of code contains suspicious code that may cause undesired performance but also suggesting a correction for the suspicious code.

As an example of an algorithmic model that may be trained, Salesforce Einstein provides an integrated set of artificial intelligence ("AI") technologies. Salesforce Einstein may be trained using the operations described herein to devise a predictive model or algorithm for predicting when a section of code contains suspicious code that may cause undesired performance.

Finally, the example process 100 includes operations to examine a section of code and identify suspicious code contained therein (operation 106). Using the trained model, i.e., the software classifier, a section of code can be examined for suspicious code while the code is under development. This may reduce the software development time because many potential errors may be identified earlier on in the development cycle without having to execute the code.

Figure 2:
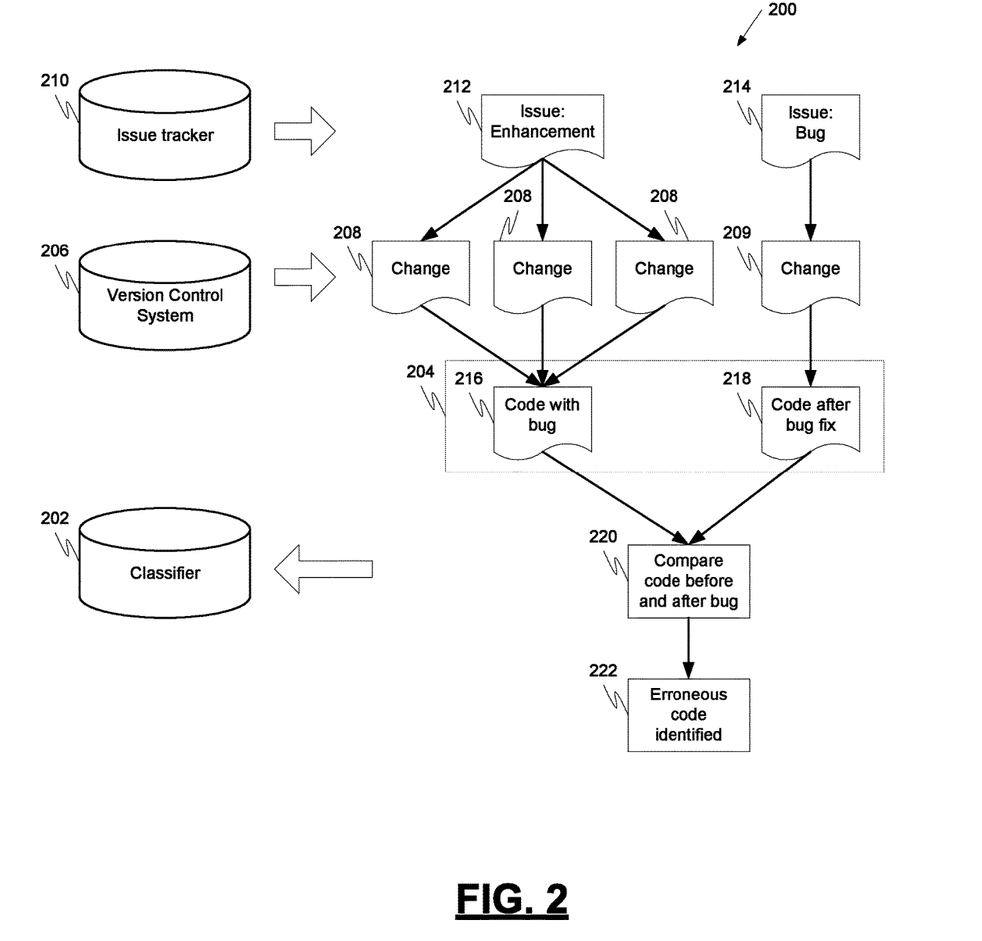
FIG. 2 is a diagram depicting an example system for collecting software error data sets, in accordance with some embodiments.

FIG. 2 is a diagram depicting an example system 200 for collecting software error data sets. To train a software classifier 202, a large number software error data sets may be used 204. In this example, millions of software error data sets can be made available for training. An engineering department may use a version control system 206 to track changes 208, 209 to software code and an issue tracker 210 to track improvements 212 and bug fixes 214. With the combined availability of a version control system 206 and an issue tracker 210, software changes that fixed previous errors can be identified from the numerous recorded changes for inclusion in software error data sets 204. By identifying changes 209 that fixed previous errors, a software error data set can be extracted having a proposed code section 216 with erroneous code that caused undesired performance and a corrected code section 218 containing code changes that corrected the erroneous code in the proposed code section. By examining the corrected code section (operation 220), software classifier 202 can learn what code looks like that is likely to contain errors (operation 222).

Figure 3:
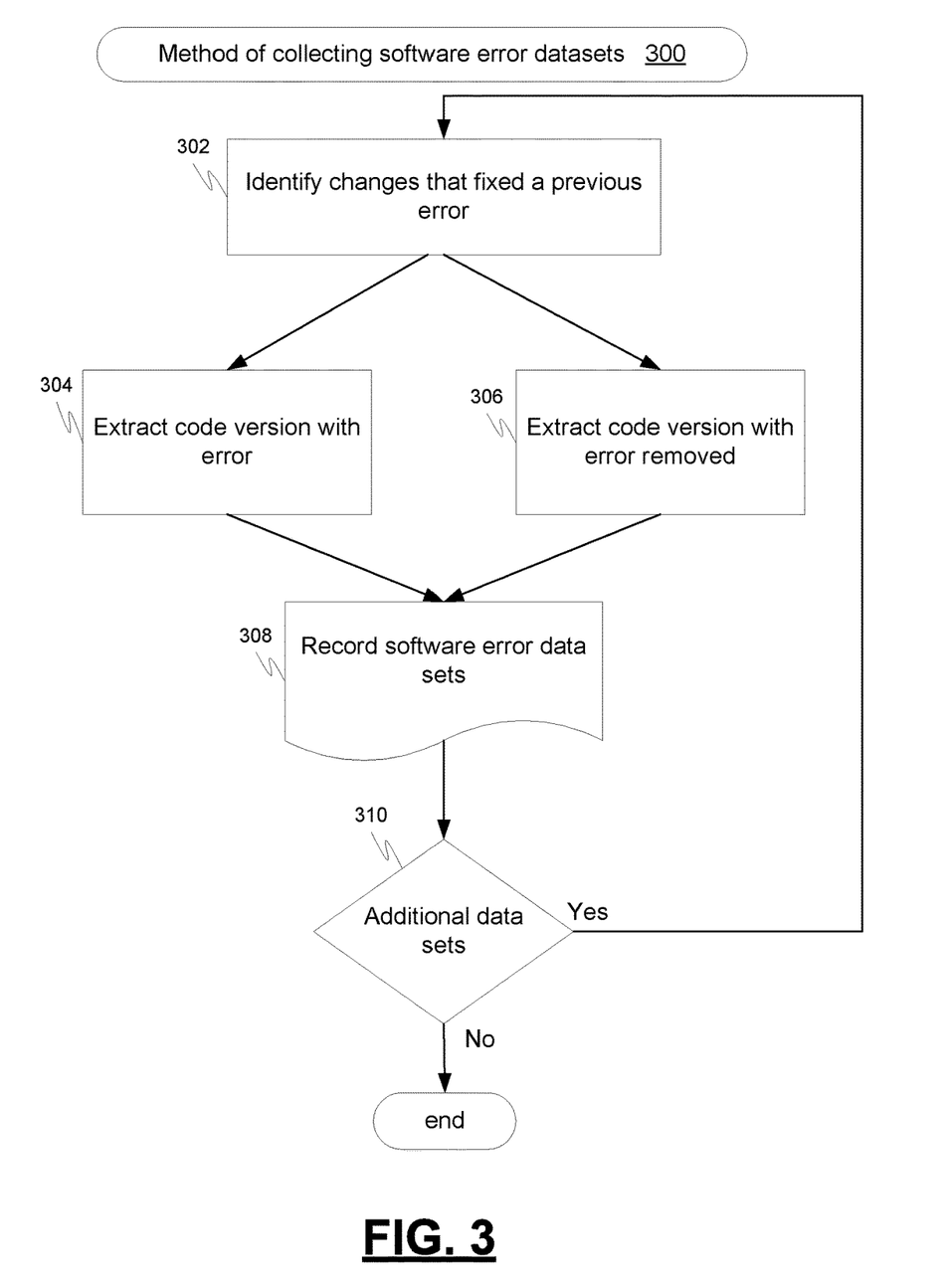
FIG. 3 is a process flow chart depicting an example process of collecting software error data sets, in accordance with some embodiments.

FIG. 3 is a process flow chart depicting an example process 300 of collecting software error data sets. The example process 300 includes identifying code changes that fixed a previous error (operation 302). A version control system and an issue tracker may be used to identify code changes that fixed a previous error. The selected code changes should be in the same computer language. Separate classifiers should be trained for each computer language. Different computer languages may be designated by a different filename extension or shebang notation The example process 300 includes extracting a version of the code section with the error (operation 304) and extracting a version of the code section without the error (operation 306). The relative order in which the "extracting a version of the code section with the error" operations and the "extracting a version of the code section without the error" operations are performed is not important. Either set of operations may be performed before the other set of operations is performed. It matters not which set of operations is performed first. Alternatively, both sets of operations may be performed in parallel.

The extracted versions of the code are recorded as a software error data set (operation 308). The extracted versions of the code can be stored in a data record in a computer storage device for later use in training a prediction model.

If additional data sets are desired for training (yes at decision 310), then the operations of identifying code changes that fixed a previous error, extracting a version of the code section with the error, extracting a version of the code section without the error, and recording the extracted the versions of the code section are repeated. Otherwise (no at decision 310), the example process 300 ends.

Figure 4:
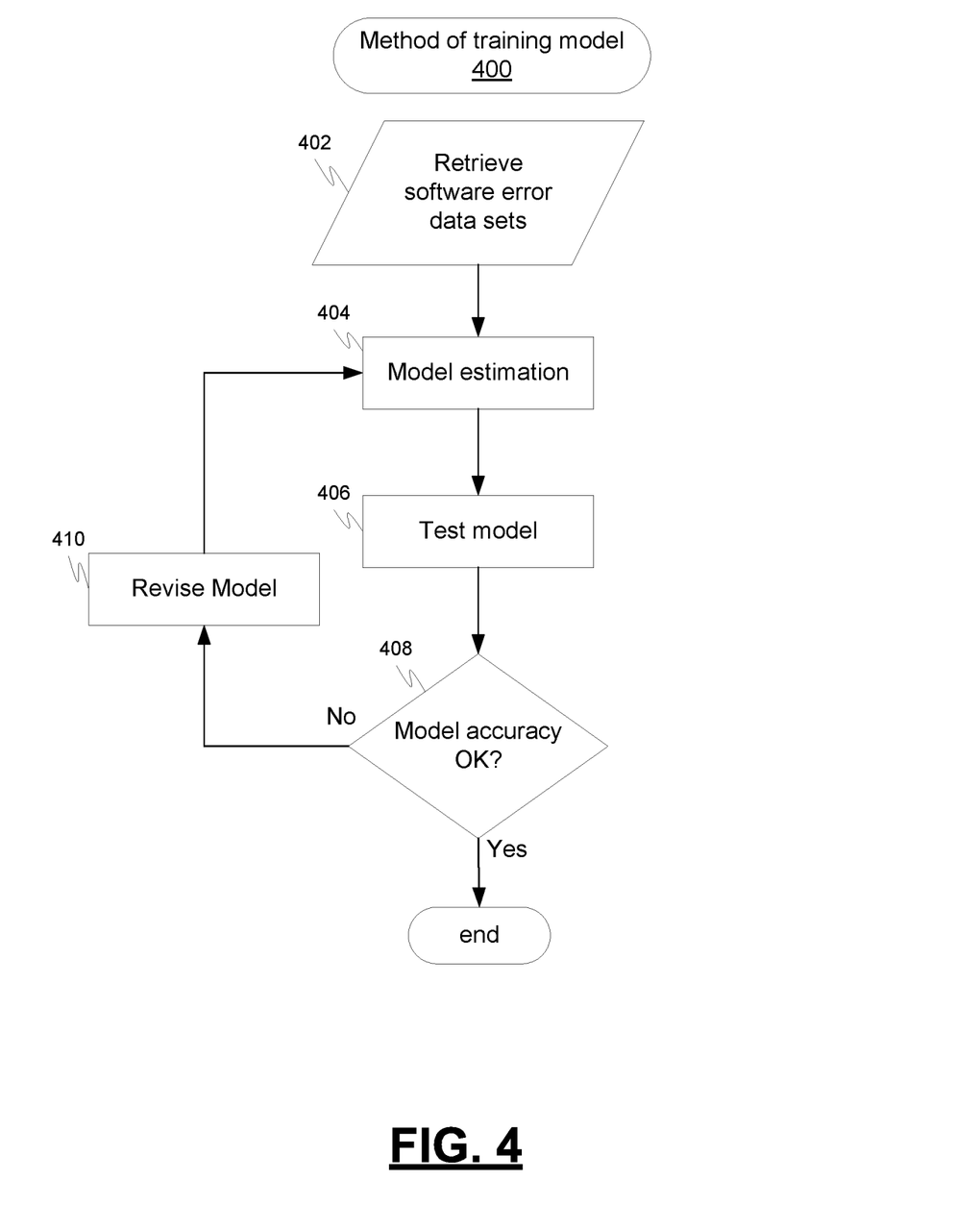
FIG. 4 is a process flow chart depicting an example process for training a model to devise a software classifier, in accordance with some embodiments.

FIG. 4 is a process flow chart depicting an example process 400 for training a model to devise a software classifier. The example process 400 includes retrieving the software error data sets, i.e., the extracted version of the code section with the error and the extracted version of the code section with the error (operation 402).

The retrieved platform feature data is used to train a model to devise a prediction model through model estimation (operation 404). The prediction model learns a rule for predicting when a code section contains an error. The prediction model may be used to examine a section of code and predict whether the code section contains suspicious code that may not execute as intended.

After the prediction model is initial trained, the prediction model and the learned rule may be tested (operation 406). The testing may involve examining a code section known to be either error free or erroneous and recording how accurately the prediction model predicted whether the code section contained suspicious code to determine the prediction accuracy.

A decision is made regarding the prediction model's accuracy (decision 408). If the prediction model meets accuracy thresholds, then the process ends. If the prediction model does not meet accuracy thresholds (no at decision 408), then a determination is made to revise the model (operation 410) and the prediction model is adjusted to form a revised prediction model (operation 404). The cycle of model estimation (operation 404), model testing (operation 406), and model revision (operation 410) may be repeated until the model accuracy is acceptable (yes at decision 408). The example process 400 may then end.

Figure 5:
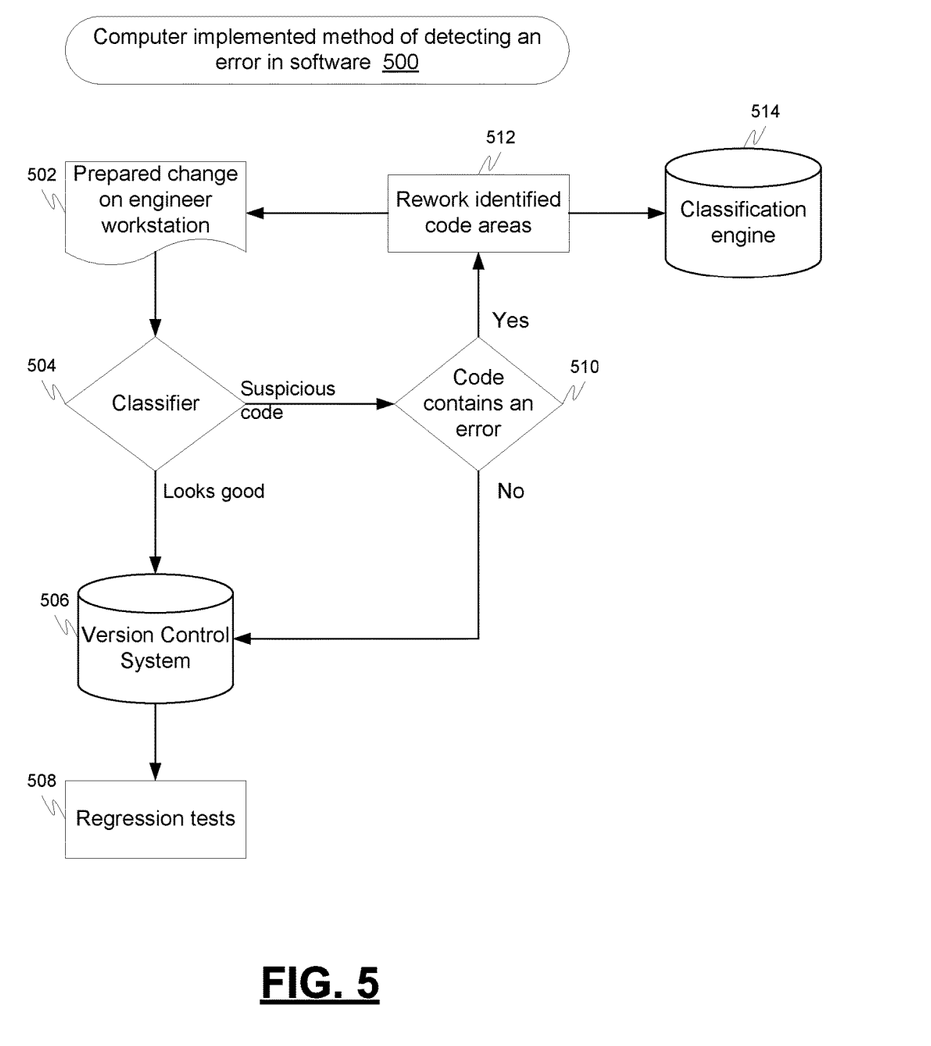
FIG. 5 is a process flow chart depicting an example computer-implemented process of detecting an error in software code, in accordance with some embodiments.

FIG. 5 is a process flow chart depicting an example computer-implemented process 500 of detecting an error in software code. A trained predictive model (i.e., software classifier) is injected into a code development process before code is submitted to a version control system (i.e., pre-check in). Injecting the software classifier into the coding process pre-check in can provide quicker feedback to the programmer. The software classifier can analyze a proposed code change prior to submission to the version control system to determine if there is a possible error and warn the user before submission.

In the example process 500, a programmer can prepare proposed code changes (operation 502). Before submitting the code changes to the version control system, the programmer can submit the proposed code changes to the software classifier for the classifier to determine if suspicious code exists in the proposed code changes (operation 504). Submission to the software classifier may be done manually or automatically as part of the process of submitting code to the version control system. If the classifier determines that suspicious code does not exist, the code can be submitted to the version control system (operation 506). After submission to the version control system, other tests employed by the organization for testing software such as regression tests may be executed (operation 508).

If the software classifier identifies suspicious code, the suspicious code can be submitted to the programmer or some other entity to determine if the suspicious code indeed contains erroneous code (operation 510). If it is determined that the suspicious code does not contain an error (no at operation 510), the code can be submitted to the version control system (operation 506). After submission to the version control system, other tests employed by the organization for testing software such as regression tests may be executed (operation 508).

If it is determined that the suspicious code does indeed contain an error (yes at operation 510), the suspicious code (and/or other sections of the code) can be reworked (operation 512). The reworked code can be incorporated into the proposed code changes (operation 502) and resubmitted to the software classifier (operation 504). Additionally, the identified suspicious code and the reworked code that fixed an error found in the suspicious code can be provided to the classification engine to improve the prediction accuracy of the classification engine (operation 514).

Figure 6:
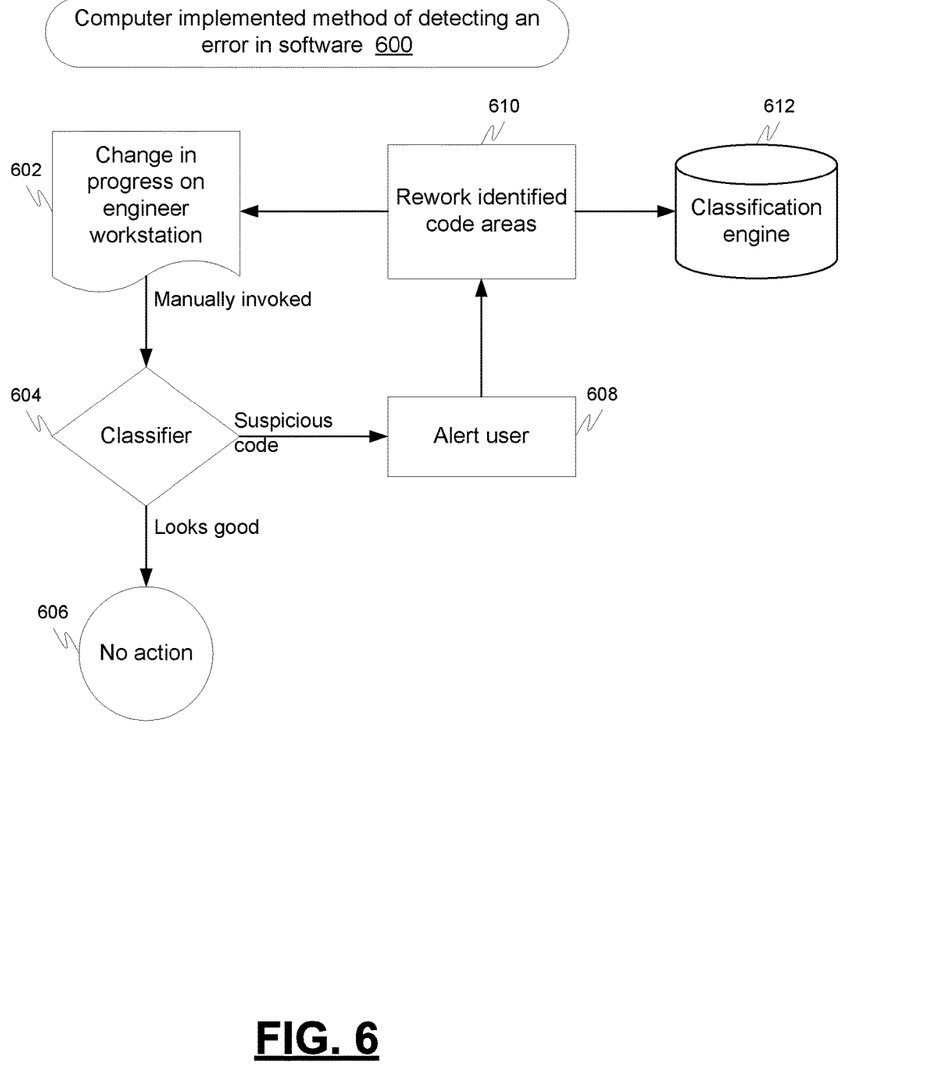
FIG. 6 is a process flow chart depicting another example computer-implemented process of detecting an error in software code, in accordance with some embodiments.

FIG. 6 is a process flow chart depicting another example computer-implemented process 600 of detecting an error in software code. The example process 600 is similar to the example process 500, but, in this example, a software classifier may be invoked at will by a programmer as his or her work progresses. Invoking the software classifier at will may provide quicker feedback to the programmer. The software classifier can analyze a proposed code change to determine if there is a possible error and alert the user.

In the example process 600, a programmer can prepare proposed code changes (operation 602). At will, the programmer can invoke the software classifier to evaluate proposed code changes to determine if suspicious code exists in the proposed code changes (operation 604). If the classifier determines that suspicious code does not exist, no further action may need to be taken with the proposed code changes (operation 506) and the programmer may move on.

If the software classifier identifies suspicious code, the suspicious code can be submitted to the programmer or some other entity to determine if the suspicious code indeed contains erroneous code (operation 608). If it is determined that the suspicious code does indeed contain an error, the suspicious code (and/or other sections of the code) can be reworked (operation 610). The reworked code can be incorporated into the proposed code changes (operation 602) and resubmitted to the software classifier (operation 604). Additionally, the identified suspicious code and the reworked code that fixed an error found in the suspicious code can be provided to the classification engine to improve the prediction accuracy of the classification engine (operation 612).

Figure 7:
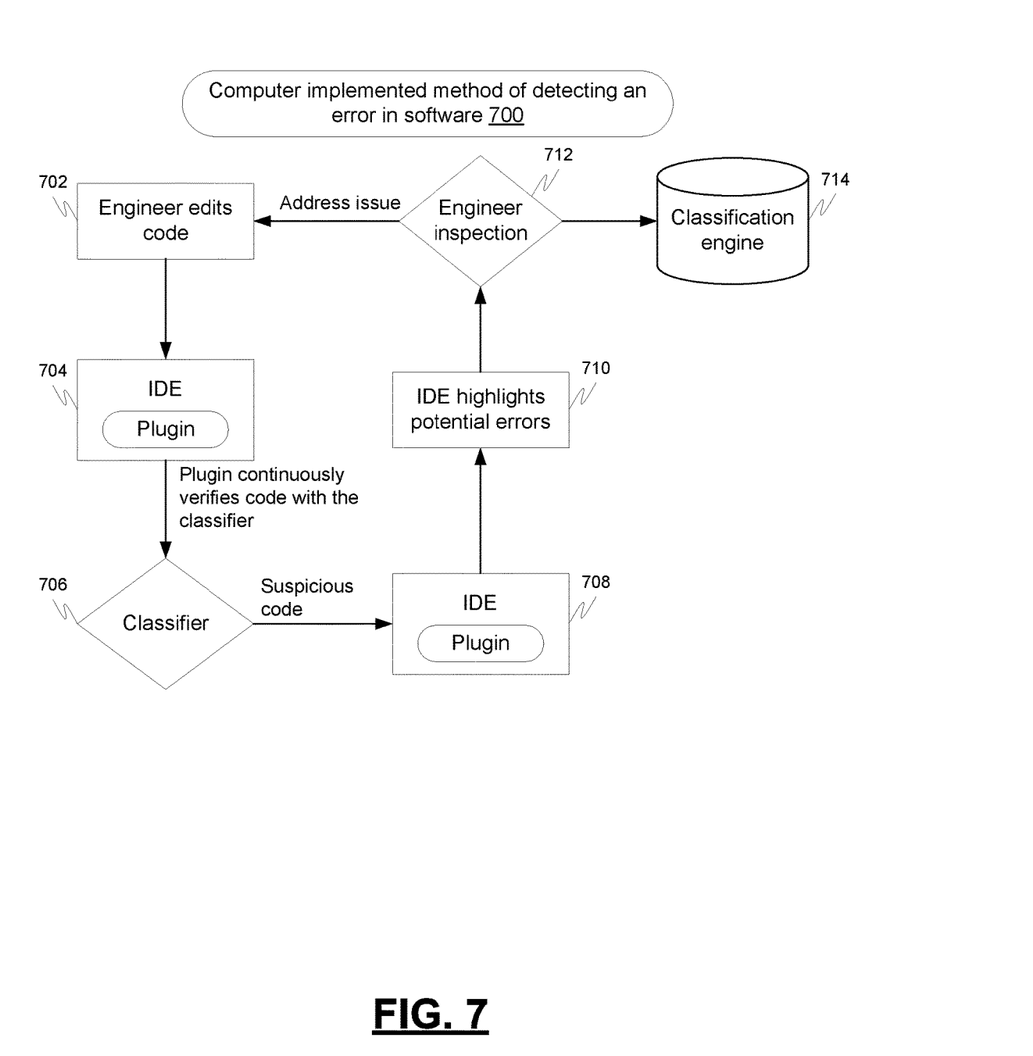
FIG. 7 is a process flow chart depicting another example computer-implemented process of detecting an error in software code, in accordance with some embodiments.

FIG. 7 is a process flow chart depicting another example computer-implemented process 700 of detecting an error in software code. The example process 700 is similar to the example process 600, but, in this example, a software classifier may be integrated within a programmer's integrated development environment (IDE), such as eclipse or intellij. Integrating the software classifier within an IDE could allow immediate alerting of suspicious code. The suspicious code would be highlighted on the fly as it is being written. This would also allow immediate feedback to the classifier, as the programmer will have the opportunity to confirm the code in the case of a misclassification.

In the example process 700, a programmer can edit code (operation 702). The IDE can invoke the software classifier, as a plugin to the IDE, (operation 704) and the software classifier can evaluate code edits to determine if suspicious code exists as a result of the code edits (operation 706). If the software classifier identifies suspicious code, the classifier can identify the suspicious code to the IDE (operation 708) and the IDE highlight potential errors for the programmer (operation 710). The programmer can inspect the suspicious code (operation 712) and if it determines that the suspicious code does indeed contain an error, the suspicious code (and/or other sections of the code) can be edited (operation 702). The edited code can be resubmitted to the software classifier via the IDE (operations 704 and 706). If the programmer determines that the identified suspicious code does not contain an error, the programmer can confirm the code, in this case of misclassification, to the classification engine to improve the prediction accuracy of the classification engine (operation 714).

Because the software classifier can be trained prior to use in evaluating coding changes and retrained during use in evaluating coding changes, the software classifier may be trained not only to identify possible errors, but also to identify typical fixes for common errors. This feature could be incorporated into the pre-check in example of example process 500, the quick check example of example process 600, and the continuous check example of example process 700.

Figure 8:
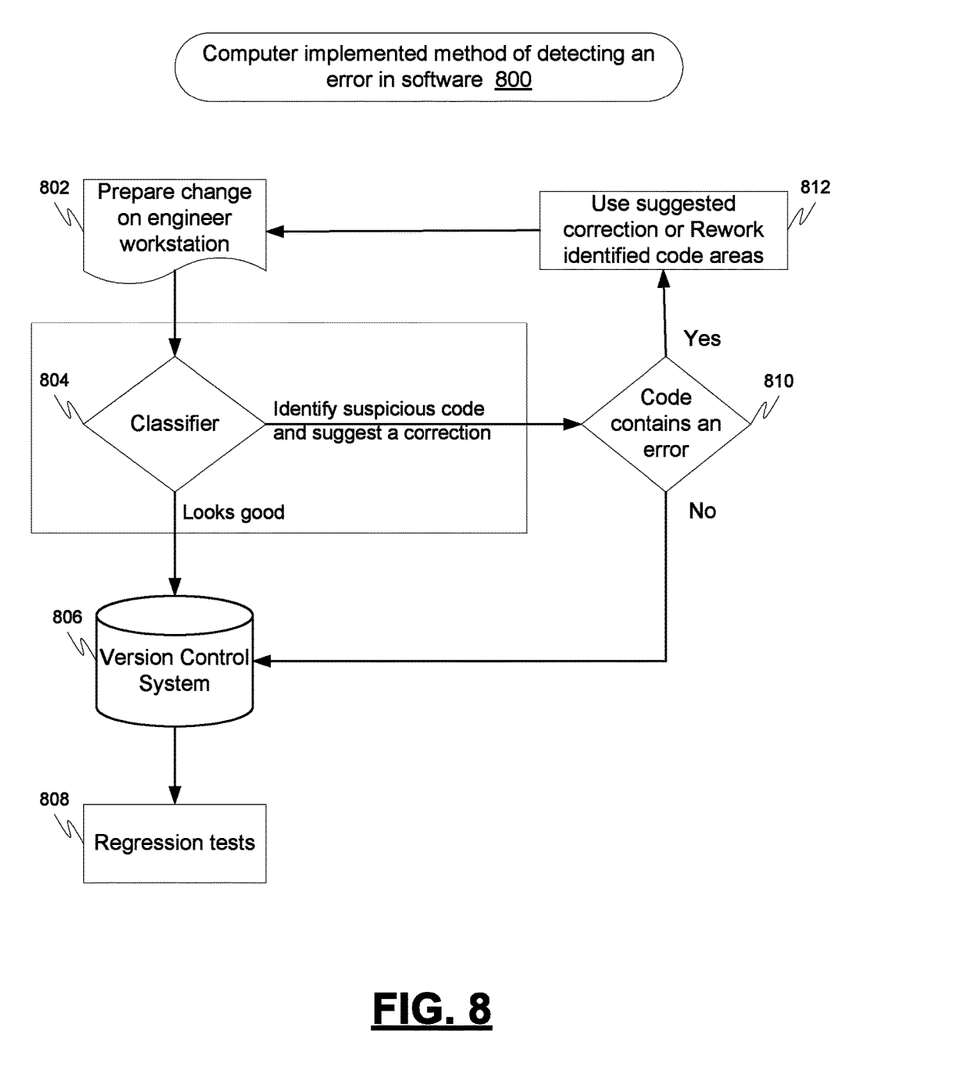
FIG. 8 is a process flow chart depicting an example computer-implemented process of detecting an error in software code and suggesting a correction, in accordance with some embodiments.

FIG. 8 is a process flow chart depicting an example computer-implemented process 800 of detecting an error in software code and suggesting a correction. The example process 800 is similar to the example process 500. A trained predictive model (i.e., software classifier) is injected into a code development process before code is submitted to a version control system (i.e., pre-check in). The software classifier can analyze a proposed code change prior to submission to the version control system to determine if there is a possible error and warn the user before submission.

Additionally, the software classifier, in this example, is trained not only to identify possible errors, but also to identify typical fixes for common errors.

In the example process 800, a programmer can prepare proposed code changes (operation 802). Before submitting the code changes to the version control system, the programmer can submit the proposed code changes to the software classifier for the classifier to determine if suspicious code exists in the proposed code changes (operation 804). If the classifier determines that suspicious code does not exist, the code can be submitted to the version control system (operation 806). After submission to the version control system, other tests employed by the organization for testing software such as regression tests may be executed (operation 808).

If the software classifier identifies suspicious code, the suspicious code and a suggested correction can be submitted to the programmer or some other entity to determine if the suspicious code indeed contains erroneous code (operation 810). If it is determined that the suspicious code does not contain an error (no at operation 810), the code can be submitted to the version control system (operation 806). After submission to the version control system, other tests employed by the organization for testing software such as regression tests may be executed (operation 808).

If it is determined that the suspicious code does indeed contain an error (yes at operation 810), the suggested correction can be evaluated for use or the suspicious code can be reworked (operation 812). The suggested correction or reworked code can be incorporated into the proposed code changes (operation 802) and resubmitted to the software classifier (operation 804).

Figure 9:
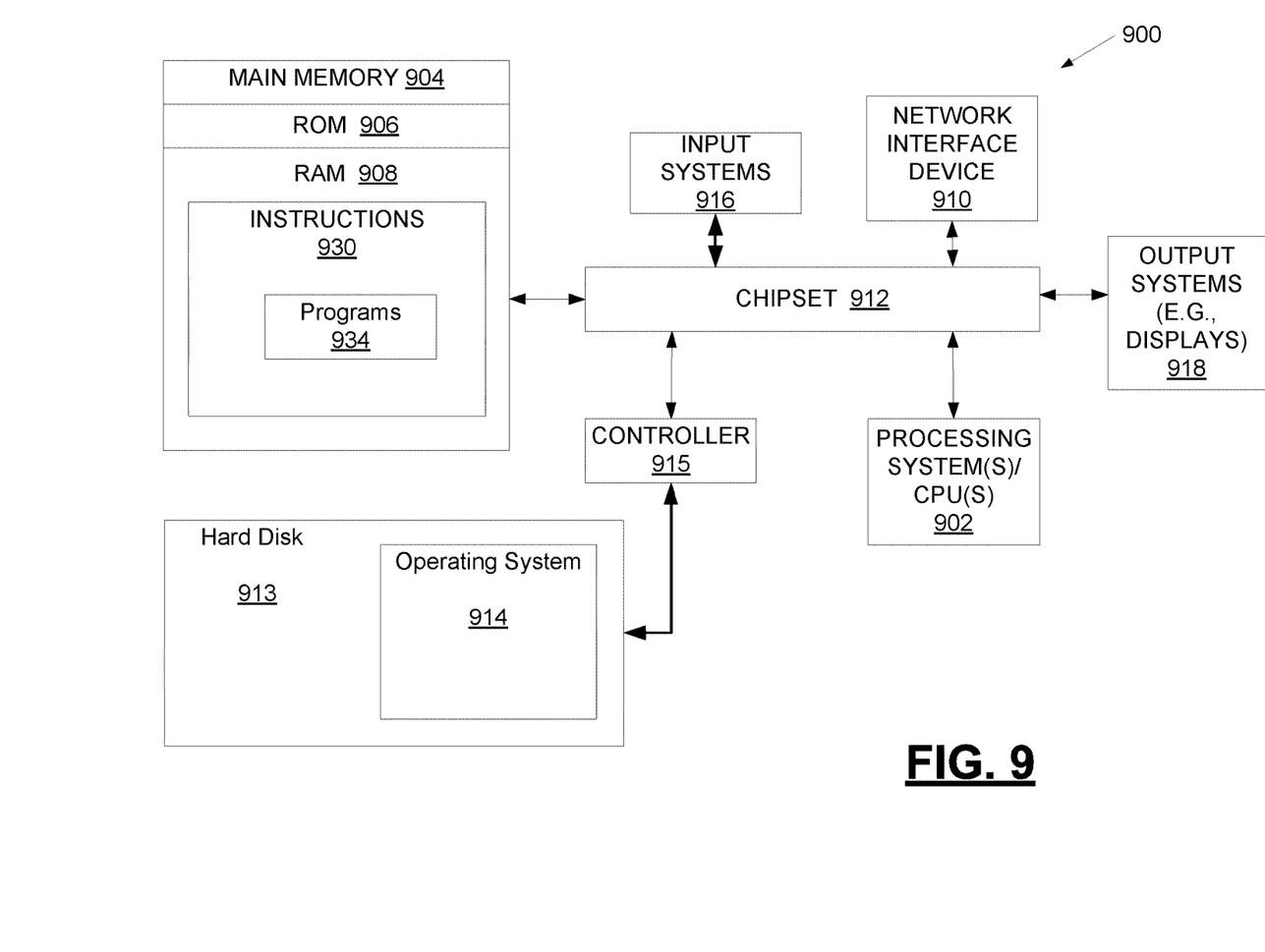
FIG. 9 is a schematic block diagram of an example computer system, in accordance with some embodiments.

FIG. 9 is a schematic block diagram of an example computer system that can be used to implement the techniques and methods described herein. The example computer system can include one or more processing system(s) 902, main memory 904, a network interface device (NID) 910, a chipset 912, a hard disk 913 and hard disk controller 915, input systems 916, and output systems 918.

The chipset 912 is usually located on a motherboard and is a set of electronic components (e.g., in an integrated circuit) that interconnects and manages the data flow between the processing system(s) 902 and other elements of the computer system and connected peripherals. For instance, the chipset 912 provides an interface between the processing system(s) 902 and the main memory 904, and also includes functionality for providing network connectivity through the NID 910, such as a gigabit Ethernet adapter. The chipset 912 typically contains the processor bus interface (also known as a front-side bus), memory controllers, bus controllers, I/O controllers, etc.

Processing system(s) 902 represents one or more general-purpose processing devices such as a microprocessor, central processing unit, or the like. More particularly, the processing system(s) 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 902 may also be one or more special-purpose processing devices such as an application specific integrated circuit (ASIC), a field programmable gate array (FPGA), a digital signal processor (DSP), network processor, or the like.

The processing system(s) 902 can include one or more central processing units (CPUs) that operate in conjunction with the chipset 912. The processing system(s) 902 perform arithmetic and logical operations necessary for the operation of the example computer system.

The NID 910 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 916 (or input device(s)) allow a user to input information to the computer system and can include things such as a keyboard, a mouse or other cursor pointing device, a pen, a voice input device, a touch input device, a webcam device, a microphone, etc. Output system(s) 918 (or output device(s)) present information to the user of the computer system and can include things such as a display, monitor, speakers, or the like.

The chipset 912 can provide an interface to various forms of computer-readable storage media including a main memory 904 (e.g., read-only memory (ROM), flash memory, dynamic random access memory (DRAM) such as synchronous DRAM (SDRAM)), and hard disk 913. The processing system(s) 902 can communicate with the various forms of computer-readable storage media via the chipset 912 and appropriate buses.

A hard disk 913 is a form of non-volatile memory that can store an operating system (OS) 914. The operating system 914 is software that is copied into RAM and executed by the processing system(s) 902 to control the operation of the example computer system, manage computer hardware and software resources, and provide common services for computer programs executed by the processing system(s) 902. Regardless of the implementation, the operating system 914 includes many different "components" that make the different parts of the example computer system work together. The disk controller 915 is the controller circuit which enables the processing system 902 to communicate with a hard disk 913, and provides an interface between the hard disk 913 and the bus connecting it to the rest of the system.

The main memory 904 may be composed of many different types of memory components. The main memory 904 can include non-volatile memory (such as read-only memory (ROM) 906, flash memory, etc.), volatile memory (such as random access memory (RAM) 908), or some combination of the two. The RAM 908 can be any type of suitable random access memory including the various types of dynamic random access memory (DRAM) such as SDRAM, the various types of static RAM (SRAM). The main memory 904 (as well as the processing system(s) 902) may be distributed throughout the example computer system.

The ROM 906 of the main memory 904 can be used to store firmware that includes program code containing the basic routines that help to start up the example computer system and to transfer information between elements within the example computer system. The ROM of the main memory 904 may also store other software components necessary for the operation of the example computer system.

The RAM 908 stores programs/instructions 930 or executable code for one or more programs 934 that can be loaded and executed at processing system(s) 902 to perform various functions. The programs/instructions 930 are computer readable program code that can be stored in RAM 908 (or other a non-transitory computer readable medium of the example computer system) that can be read and executed by processing system(s) 902 to perform various acts, tasks, functions, and steps as described herein. The methods and techniques described herein can be captured in programming instructions 930 for execution by the processing system 902 to cause the example computer system to perform the described methods, processes, and techniques.

The apparatus, systems, techniques and articles described herein allow for detecting potential errors in software code during the software development process using a software classifier devised using machine learning techniques. The software classifier can learn to detect suspicious software code by studying software code containing errors. The classifier can predict whether a coding change may cause a malfunction in the software and identify that coding change as containing suspicious software. The classifier may also learn to suggest potential fixes for suspicious software code. The described techniques allow for the prediction of suspicious code without actually implementing and running the software code. Additionally, the prediction accuracy of the software classifier may be systematically improved by iteratively adjusting the prediction model. The classifier may also help improve the programming abilities of a programmer by providing immediate feedback while the programmer is programming.

In one embodiment, a computer-implemented method of detecting a likely software malfunction is provided. The method comprises collecting a plurality of software error data sets wherein each software error data set comprises a proposed code section containing an error and a corrected code section containing code changes that fixed the error in the proposed code section. The method further comprises training a computer-implemented algorithmic model using the collected software error data sets to devise a software code classifier for predicting a likely error in a code section, reviewing a section of code using the software code classifier, and identifying suspicious code in the reviewed section of code as containing a suspected error using the software code classifier.

These aspects and other embodiments may include one or more of the following features. Collecting a plurality of software error data sets may comprise applying an issue tracker to identify a version of code comprising code changes that fixed an error, extracting the version of code identified by the issue tracker as not having the error, and extracting a prior version of the code identified by the issue tracker that has the error. The method may further comprise generating a confirmation alert that identifies the suspicious code and receiving confirmation that the suspicious code contains an error. The method may further comprise retraining the software code classifier using the confirmation that the suspicious code contains an error. The method may further comprise generating a confirmation alert that identifies the suspicious code and receiving confirmation that the suspicious code does not contain an error. The method may further comprise retraining the software code classifier using the confirmation that the suspicious code does not contain an error. The method may further comprise suggesting a correction to the suspected error in the suspicious code. Reviewing a section of code using the software code classifier may comprise invoking the software code classifier prior to submission of the section of code to a version control system. Reviewing a section of code using the software code classifier may comprise invoking the software code classifier from an integrated development environment (IDE). Reviewing a section of code using the software code classifier may comprise manually invoking the software code classifier at will by a user. Training the computer-implemented algorithmic model may comprise learning a rule for predicting when a code section contains an error, testing the learned rule, and adjusting and retesting the rule until the model has achieved a desired accuracy goal.

In another embodiment, a system for detecting a likely software malfunction is disclosed. The system comprises one or more processors and non-transient computer readable media encoded with programming instructions configurable to cause the one or more processors to implement a method. The method comprises collecting a plurality of software error data sets wherein each software error data set comprises a proposed code section containing an error and a corrected code section containing code changes that fixed the error in the proposed code section. The method further comprises training a computer-implemented algorithmic model using the collected software error data sets to devise a software code classifier for predicting a likely error in a code section, reviewing a section of code using the software code classifier, and identifying suspicious code in the reviewed section of code as containing a suspected error using the software code classifier.

These aspects and other embodiments may include one or more of the following features. The method may further comprise accessing an issue tracker to identify a code section with changes that fixed an error, extracting the version of code identified by the issue tracker, and extracting a prior version of the code identified by the issue tracker that has the error. The method may further comprise generating a confirmation alert that identifies the suspicious code, receiving confirmation that the suspicious code contains an error, and retraining the software code classifier using the confirmation. The method may further comprise generating a confirmation alert that identifies the suspicious code, receiving confirmation that the suspicious code does not contain an error, and retraining the software code classifier using the confirmation. The method may further comprise suggesting a correction to the suspected error in the suspicious code. The method may further comprise learning a rule for predicting when a code section contains an error, testing the learned rule, and adjusting and retesting the rule until the model has achieved a desired accuracy goal.

In another embodiment, non-transient computer readable media encoded with programming instructions configurable to perform a method is provided. The method comprises collecting a plurality of software error data sets wherein each software error data set comprises a proposed code section containing an error and a corrected code section containing code changes that fixed the error in the proposed code section. The method further comprises training a computer-implemented algorithmic model using the collected software error data sets to devise a software code classifier for predicting a likely error in a code section, reviewing a section of code using the software code classifier, and identifying suspicious code in the reviewed section of code as containing a suspected error using the software code classifier.

These aspects and other embodiments may include one or more of the following features. The method may further comprise generating a confirmation alert that identifies the suspicious code, receiving confirmation that the suspicious code contains an error, and retraining the software code classifier using the confirmation. The method may further comprise generating a confirmation alert that identifies the suspicious code, receiving confirmation that the suspicious code does not contain an error, and retraining the software code classifier using the confirmation.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A computer-implemented method in a software classifier that comprises one or more processors configured by programming instructions encoded on non-transient computer readable media to implement an algorithmic model that has been trained using machine learning techniques to predict suspicious code in a reviewed code section, the algorithmic model having been trained using a plurality of software error data sets, each software error data set including a proposed code section containing an error and a corrected code section containing code changes that fixed the error in the proposed code section, the method comprising:
    analyzing a first code section;
    identifying a segment of the first code section as containing suspicious code using the trained algorithmic model;
    submitting the identified suspicious code segment to a code checking entity to determine if the suspicious code segment contains an error; and
    when the code checking entity determines that the suspicious code segment does not contain an error, causing the algorithmic model to be retrained, using the suspicious code segment not containing an error, to not identify a similar code segment as containing suspicious code.

2. The method of claim 1, further comprising causing the algorithmic model to be retrained using the suspicious code segment containing an error when the code checking entity determines that the suspicious code segment contains an error.

3. The method of claim 1 further comprising submitting proposed corrections for the suspicious code segment when the code checking entity determines that the suspicious code segment contains an error.

4. The method of claim 1, wherein the analyzing a first code section comprises analyzing the first code section prior to submission of the first code section to a version control system.

5. The method of claim 1, wherein the analyzing a first code section comprises invoking the software classifier from an integrated development environment (IDE) to analyze the first code section.

6. The method of claim 1, wherein the analyzing a first code section is performed responsive to a user manually invoking the software classifier at will to analyze the first code section.

7. The method of claim 1, wherein the algorithmic model was trained by a method comprising:
    learning a rule for predicting when a code section contains an error;
    testing the learned rule; and
    adjusting and retesting the rule until the model has achieved a desired accuracy goal.

8. A software development system configured to detect potentially defective software code, the system comprising:
    a software classifier comprising one or more processors configured by programming instructions encoded on non-transient computer readable media, the software classifier configured to implement an algorithmic model that has been trained using machine learning techniques to predict suspicious code in a reviewed code section, the algorithmic model having been trained using a plurality of software error data sets, each software error data set including a proposed code section containing an error and a corrected code section containing code changes that fixed the error in the proposed code section, the software classifier further configured to:
    analyze a first code section;
    identify a segment of the first code section as containing suspicious code using the trained algorithmic model;
    submit the identified suspicious code segment to a code checking entity to determine if the suspicious code segment contains an error; and
    when the code checking entity determines that the suspicious code segment does not contain an error, cause the algorithmic model to be retrained, using the suspicious code segment not containing an error, to not identify a similar code segment as containing suspicious code.

9. The system of claim 8, wherein the software classifier is further configured to cause the algorithmic model to be retrained using the suspicious code segment containing an error when the code checking entity determines that the suspicious code segment contains an error.

10. The system of claim 8, wherein the software classifier is further configured to submit proposed corrections for the suspicious code segment when the code checking entity determines that the suspicious code segment contains an error.

11. The system of claim 8, wherein the software classifier is further configured to analyze the first code section prior to submission of the first code section to a version control system.

12. The system of claim 8, wherein the software classifier is further configured to be invoked to analyze the first code section from an integrated development environment (IDE).

13. The system of claim 8, wherein the algorithmic model was trained by a method comprising
    learning a rule for predicting when a code section contains an error;
    testing the learned rule; and
    adjusting and retesting the rule until the model has achieved a desired accuracy goal.

14. The system of claim 8, wherein the software classifier is further configured to be manually invoked to analyze the first code section at will by a user.

15. A non-transitory computer readable storage medium embodying programming instructions configurable to cause a software classifier that comprises one or more processors configured by the programming instructions to perform a method, the software classifier configured to implement an algorithmic model that has been trained using machine learning techniques to predict suspicious code in a reviewed code section, the algorithmic model having been trained using a plurality of software error data sets, each software error data set including a proposed code section containing an error and a corrected code section containing code changes that fixed the error in the proposed code section, the method comprising:

analyzing a first code section;

identifying a segment of the first code section as containing suspicious code using the trained algorithmic model;

submitting the identified suspicious code segment to a code checking entity to determine if the suspicious code segment contains an error; and     when the code checking entity determines that the suspicious code segment does not contain an error, causing the algorithmic model to be retrained, using the suspicious code segment not containing an error, to not identify a similar code segment as containing suspicious code.

16. The non-transient computer readable media of claim 15 wherein the method further comprises causing the algorithmic model to be retrained using the suspicious code segment containing an error when the code checking entity determines that the suspicious code segment contains an error.

17. The non-transient computer readable media of claim 15, wherein the method further comprises submitting proposed corrections for the suspicious code segment when the code checking entity determines that the suspicious code segment contains an error.

18. The non-transient computer readable media of claim 15, wherein the analyzing a first code section comprises analyzing the first code section prior to submission of the first code section to a version control system.

19. The non-transient computer readable media of claim 15, wherein the analyzing a first code section comprises invoking the software classifier from an integrated development environment (IDE) to analyze the first code section.

20. The non-transient computer readable media of claim 15, wherein the analyzing a first code section is performed responsive to a user manually invoking the software classifier at will to analyze the first code section.

* * * * *